(12) United States Patent
Rozenberg et al.

(10) Patent No.: US 9,634,838 B2
(45) Date of Patent: Apr. 25, 2017

(54) COMPLEX FORMAT-PRESERVING ENCRYPTION SCHEME

(71) Applicant: International Business Machines Corporation, Armonk, NY (US)

(72) Inventors: Boris Rozenberg, Ramat Gan (IL); Mor Weiss, Ramat Yishai (IL)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 14/296,484

(22) Filed: Jun. 5, 2014

(65) Prior Publication Data
US 2015/0358159 A1 Dec. 10, 2015

(51) Int. Cl.
| H04L 29/06 | (2006.01) |
| H04L 9/14 | (2006.01) |
| G09C 1/00 | (2006.01) |
| H04L 9/06 | (2006.01) |

(52) U.S. Cl.
CPC ............... *H04L 9/14* (2013.01); *G09C 1/00* (2013.01); *H04L 9/0618* (2013.01)

(58) Field of Classification Search
CPC ...... H04L 9/0861; H04L 9/14; H04L 2209/24
See application file for complete search history.

(56) References Cited

U.S. PATENT DOCUMENTS

| 8,358,781 B2 * | 1/2013 | Schneider | ............. H04L 9/0637 380/46 |
| 8,600,048 B1 | 12/2013 | Hansen et al. | |
| 2008/0170693 A1 * | 7/2008 | Spies | ................... G06F 21/6209 380/277 |
| 2009/0310778 A1 | 12/2009 | Mueller et al. | |
| 2010/0246813 A1 * | 9/2010 | Morris | ................... H04L 9/0631 380/28 |
| 2011/0124285 A1 * | 5/2011 | Teruyama | ........... H04L 12/6418 455/41.1 |
| 2012/0039469 A1 * | 2/2012 | Mueller | ................. G06Q 20/12 380/252 |
| 2012/0143770 A1 * | 6/2012 | Pauker | ................... G06Q 20/02 705/71 |

(Continued)

OTHER PUBLICATIONS

Vidhya et all., "Format Preserving Encryption Using Feistel Cipher", IJCA Proceedings on International Conference on Research Trends in Computer Technologies (ICRTCT—2013), Feb. 2013, vol. 1 , pp. 5-8.

(Continued)

*Primary Examiner* — Dao Ho
*Assistant Examiner* — Cheng-Feng Huang
(74) *Attorney, Agent, or Firm* — Daniel Kligler

(57) ABSTRACT

Methods, computing systems and computer program products implement embodiments of the present invention that include defining multiple primitives, each primitive including ranking and unranking methods. Two or more of the multiple primitives are selected, and an operation is performed on the selected primitives, thereby defining a complex format. Upon and encryption processor receiving a data record comprising a plaintext, the complex format is applied to the plaintext, thereby generating a ciphertext, and the ciphertext is transmitted to a remote computer. Upon receiving the ciphertext, the remote computer can apply the complex format to the received ciphertext, thereby regenerating the plaintext.

17 Claims, 2 Drawing Sheets

(56) References Cited

U.S. PATENT DOCUMENTS

2012/0324215 A1  12/2012  Kim et al.
2013/0198525 A1   8/2013  Spies et al.

OTHER PUBLICATIONS

Li et al., "Format-Preserving Encryption for Character Data", Journal of Networks, vol. 7, No. 8, Aug. 2012, pp. 1239-1244.
Voltage Security, "Preserving Critical Business Functions by Maintaining Data Format", 2013. Can be found at : https://www.voltage.com/technology/format-preserving-encryption/.
Hao-Yu et al., "Generalized Format-Preserving Encryption for Character Data", College of Information Technical Science, NanKai University, TianJin, China, May 10, 2013.

\* cited by examiner

_US 9,634,838 B2_

COMPLEX FORMAT-PRESERVING ENCRYPTION SCHEME

FIELD OF THE INVENTION

The present invention relates generally to data encryption, and specifically to defining complex format-preserving encryptions schemes for encrypting plaintext.

BACKGROUND

In cryptography, an encryption cipher algorithm is applied to plaintexts in order to generate ciphertexts. Encryption schemes can be used to protect data privacy, e.g., when transmitting data over insecure communication channels or storing data on unreliable servers. Encryption can be used to secure sensitive data, such as social security numbers, credit card numbers, names and addresses from being accessed by unauthorized personnel.

The description above is presented as a general overview of related art in this field and should not be construed as an admission that any of the information it contains constitutes prior art against the present patent application.

SUMMARY

There is provided, in accordance with an embodiment of the present invention a method, defining multiple primitives, each primitive including ranking and unranking methods, selecting two or more of the multiple primitives, performing an operation on the selected primitives, thereby defining a complex format, receiving a data record including a plaintext, and applying, by an encryption processor, the complex format to the plaintext, thereby generating a ciphertext.

There is also provided, in accordance with an embodiment of the present invention a computing system, including a local memory, and an encryption processor configured, to define, in the local memory, multiple primitives, each primitive including an encryption ranking and unranking method, to select two or more of the multiple primitives, to perform an operation on the selected primitives, thereby defining a complex format, to receive a data record comprising a plaintext, and to apply, by an encryption processor, the complex format to the plaintext, thereby generating a ciphertext.

There is further provided, in accordance with an embodiment of the present invention a computer program product, the computer program product including a non-transitory computer readable storage medium having computer readable program code embodied therewith, the computer readable program code including computer readable program code configured to define multiple primitives, each primitive including an encryption ranking and unranking method, computer readable program code configured to select two or more of the multiple primitives, computer readable program code configured to perform an operation on the selected primitives, thereby defining a complex format, computer readable program code configured to receive a data record comprising a plaintext, and computer readable program code configured to apply the complex format to the plaintext, thereby generating a ciphertext.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Figure 1:
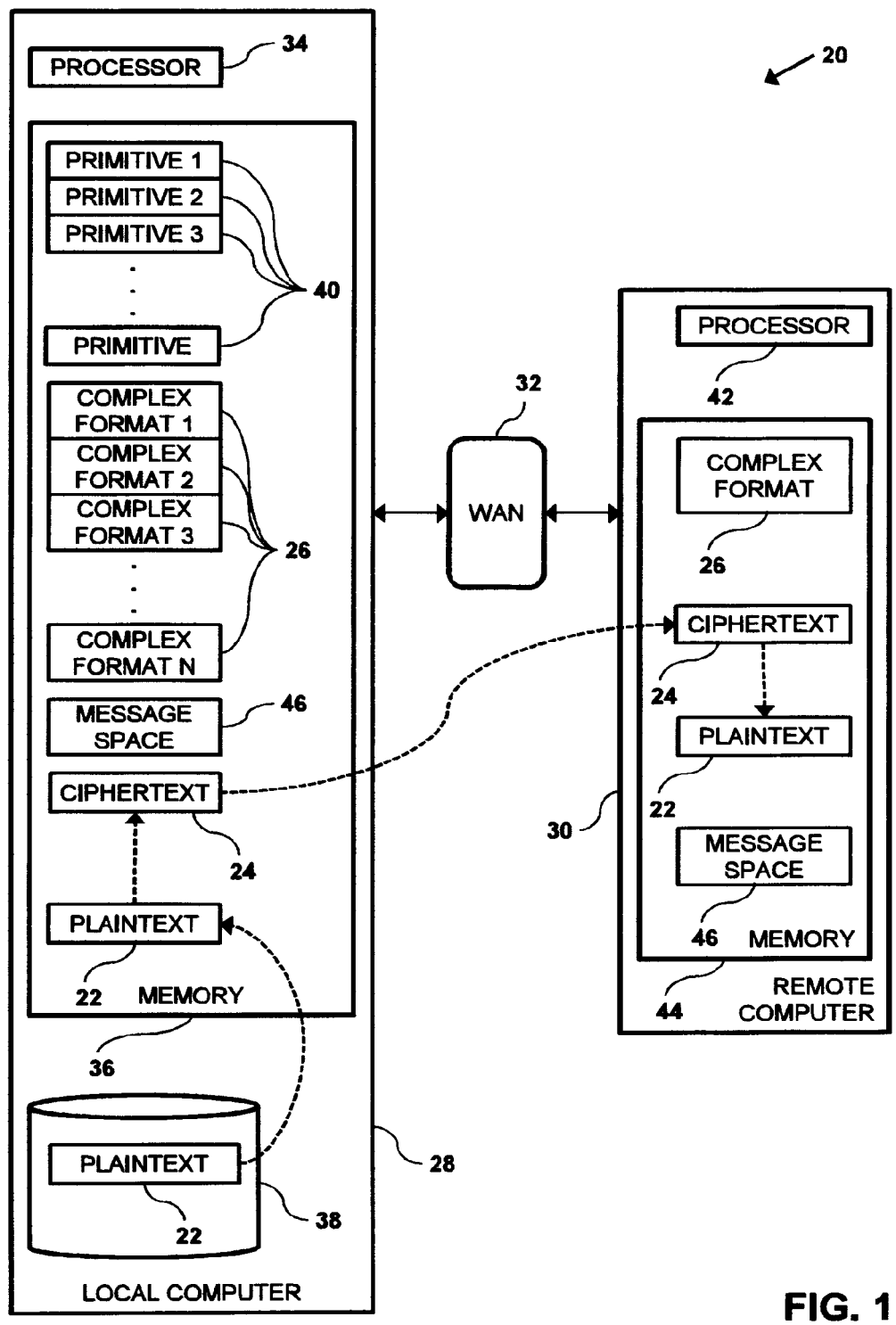
FIG. 1 is a block diagram that schematically illustrates an encryption system configured to use complex format-preserving encryption schemes, in accordance with an embodiment of the present invention.

Standard encryption schemes such as Advanced Encryption Standard (AES) are designed for encrypting fixed length plaintext (i.e., data) having a specific data format into ciphertext (i.e., encrypted data). Schemes such as AES can significantly alter the data format, which may cause disruptions both in storing and using the data. Therefore, it may be not be possible to store encrypted data in the same database table used for unencrypted data. Additionally, if the data format is altered, applications accessing the database may be unable to use the encrypted data, causing them to crash or to output incorrect values.

When encrypting plaintexts into ciphertexts, Format-Preserving Encryption (FPE) schemes enable the preservation of the plaintext's formatting when generating the ciphertext. For example, an FPE scheme may comprise a set of all strings having a fixed length l, so that every location $i=1, 2, \ldots, l$ has a set of "legal characters" that may appear in that location. Thus, in many cases, an original format F can be replaced with a larger, simplified format SF (i.e., a format containing more strings). Encryption and decryption can then be performed using the following two methods:

A Rank-then-Encipher method, which maps a format SF of size M to the set $\{1, \ldots, M\}$ (and vice-versa), thus allowing the encryption to use an integer-FPE for a domain of size M. An integer-FPE for a domain of size M maps the set $(1, \ldots, M)$ unto itself. Such schemes are generally easier to construct than FPE schemes that operate directly on general formats.

Cycle-walking, which repeats the encryption until the ciphertext has the format F. Note that as F was simplified prior to encryption, the ciphertext may have the format SF but not the format F.

In operation, a given FPE scheme typically maintains "cosmetic" characteristics of the plaintext, which are not part of the properties defining the format. This preservation of message-specific properties is an undesirable "side-effect" in FPE schemes currently known in the art. For example, consider an address of the form "name str strNum city zip country", where name, str (for street name), city and country consist of 1-4 words, each an upper-case letter followed by 1-63 lower-case letters, strNum (for street number) is a number between 1 and 1053, and zip is a 7-digit decimal number.

The address format described hereinabove preserves the lengths of all parts of the address. In other words, the name field in the ciphertext contains the same number of words, each with the same number of letters, etc. More specifically, the encryption scheme interprets every format as a union of many sub-formats, where every sub-format is defined by a length l and location-specific character-sets.

Encryption/decryption is typically performed in relation to the sub-format to which the plaintext belongs. That is, the ciphertext is from the same sub-format as the plaintext, which may allow an attacker to deduce (from the ciphertext)

many plaintext-specific characteristics which are not revealed by the simple knowledge that the plaintext is a legal address, as defined above. Consequently, the set of possible plaintexts is reduced, and the privacy of the plaintext is compromised. For example, in the address format described hereinabove, an address with a 3-word name is always encrypted to an address with a 3-word name, though addresses with 1-word, 2-word and 4-word name attributes are also valid.

Additionally, FPE schemes can be inefficient in practice in the following three respects:

First, as a format is partitioned to sub-formats according to strict message-specific attributes, it may not be clear how to represent complex formats efficiently. For example, to represent the address format described supra, the address format can be partitioned to sub-formats according to the attributes of the address elements (e.g., number of words in the name, number of letters in every name, number of digits in the street number etc.). Therefore, the number of sub-formats required to represent an address format is potentially very large. Since a format must be initialized before it is used, the pre-processing required to initialize the scheme can be too costly to be performed in practice (roughly, it depends on the number of valid addresses, rather than the length of a valid address, as in non-FPE encryption schemes).

Second, current schemes typically do not enable special encryption algorithms for large formats, which are encrypted as any smaller-sized format. (By "large formats", we mean formats whose size is much larger than $2^{128}$, which is the case for the address format described above and many others.) As these schemes rely on integer-FPEs, their efficiency depends on the efficiency of the underlying integer-FPE, and the only existing integer-FPEs for encrypting large formats are inefficient in such cases. Consequently, encryption and decryption in large formats is typically inefficient in practice (concretely, their running time is a super-polynomial in the length of the message).

Third, encryption can be inefficient even for medium-sized format (e.g, formats having size $2^{128}$) due to cycle-walking. This is due to the fact that the integer-FPE encryption (and decryption) is typically a time consuming operation, and repeated encryptions dramatically degrade the efficiency of the scheme. The average length of the cycle equals the ratio SF/F, so efficiency can be improved (on average) by reducing this ratio. In several cases (e.g., when a message format F consists of all social security numbers) one has no control over this ratio, while in other cases, the size of SF can be reduced, but this reduction can degrade security. In either case, the average cycle-length may be very long.

For example, consider the format of strings "date,SSN,CCN", where date is between "01.01.1900" and "23.09.2013", SSN is a 9-digit social security number, and CCN is a 16-digit credit card number in which the 16th bit is a luhn check-sum digit. (This format can describe credit-card transactions, by providing the card holder's SSN and the date of the transaction.)

Using the approach described hereinabove, the format can be represented as follows:

$$x_1 x.y_1 y.z_1 zzz, wwwwwwwww, ccccccccccccccc, \quad (1)$$

where $x_1$ is either 0,1,2, or 3, $y_1$ is either 0 or 1, $z_1$ is either 0 or 2, and x,y,z,w,c are some decimal digit (0, 1, 2 ... 9). The average cycle length is 434 (i.e., encryption is repeated 434 times on average).

In reality, there are at most 31 out of 40 legal day combinations (00 and 32, . . . , 39 are always illegal, regardless of the month), 12 out of 20 legal month combinations (00 and 13, . . . , 19 are illegal), and 114 out of 2000 legal year combinations. There are only $10^{15}$ legal CCN combinations, and less than 889,000,000 legal SSN combinations, so F/SF<0.0023.

When performing FPE, efficiency can be improved by splitting the format to two sub-formats, e.g., of all dates of the form xx.yy.zzzz in which zz<30, and of all dates of the form 30.yy.zzzz or 31.yy.zzzz. Thus, x1 can be restricted to the values 0, 1 or 2 in the first sub-format, while in the second sub-format $x_1$ can be restricted to the value 3, and x can be restricted to the values 0 or 1. (The same "trick" can be used to restrict the year to either 19xx or 20xx.)

However, this approach significantly degrades security, since a ciphertext of the form 30.yy.zzzz . . . , could only result from a transaction that took place on the 30th or the 31st. (Notice that this also implies the transaction did not take place on February.) It is important to note that SF/F is only an average bound on the number of repeated encryptions, where the actual number may be much larger, and cannot be predicted. This motivates eliminating the use of cycle-walking.

Embodiments of the present invention provide methods and systems for identifying several simple formats and composition operations which can be used to represent general formats, and using these simple formats provide a general logic for ranking and unranking general formats in an inclusive manner (namely, ranking all ingredients of the format together, instead of ranking every building-block separately). As described hereinbelow, embodiments of the present invention:

May not require the original format to be partitioned into sub-formats, thus optimizing the security guarantee.
  May consider unique format properties, and thus completely avoids cycle-walking (improving efficiency).
  Address the efficiency issue arising for large formats, by offering a flexible method of partitioning a format according to the format structure (instead of the message structure), thus hiding message-specific attributes, and preserving security, as much as possible.
  Provide frameworks for defining general formats (by defining format building-blocks and composition operations), and efficiently defining complex schemes.
  Enable a definition of general formats, by defining format building-blocks and composition operations.
  Enable a definition of ranking and unranking methods, which may be used in combination with the Rank-then-Encipher framework.
  Provide encryption and decryption algorithms of a General-format FPE scheme.
  Provide support for large formats, and thus achieving a flexible efficiency-security tradeoff.

Systems implementing embodiments of the present invention provide a framework for representing general formats. The systems can consider the specific properties defining the format, and partition the format into sub-formats only when the format is rendered too large, thereby creating a framework where general formats can be represented efficiently.

The strategy of representing formats by simpler building blocks has an added advantage that explicit ranking and unranking methods can be designed for any format defined by the framework. Thus, there is no need to "simplify" formats. In operation, each format can be directly mapped to a numerical domain, and therefore cycle-walking can be completely eliminated. This improves the efficiency of the scheme without compromising its security. Moreover, actual, not average, upper bounds can be obtained on the running time of algorithms described herein.

Furthermore, by providing a collection of "rigid" and "non-rigid" formats, together with strategies for linking them together to form more complex formats, formats containing "rigid" formats (such as SSNs, CCNs, etc.) can be captured while maintaining the ability to rank the "rigid" sub-format using its designated ranking algorithm. In some embodiments, the ranking in all previous solutions collapses to ranking of fixed-length strings with index-specific character-sets, thus necessarily incurring cycle-walking.

The general-format FPE schemes (obtained through the format-representation framework and the ranking and unranking methods) described herein have provable security guarantees. More specifically, embodiments of the present invention can provide unique schemes that preserve only format properties, without preserving any message-specific properties. This is achieved by inclusive ranking and unranking methods for general formats (i.e., ranking a string in relation to all strings with the given format). Thus, embodiments described herein are typically as secure as the underlying integer-FPE, which is provably-secure.

Finally, systems implementing embodiments of the present invention can provide a practical solution for large-format encryption, by incorporating a user-specified upper bound on format sizes. Specifically, large formats can be partitioned into as few sub-formats as possible, and the partition is defined according to format-specific, rather than message-specific, properties. Thus, the efficiency-security tradeoff of the scheme can be controlled. In some embodiments, security can be increased (incurring only a slight efficiency degradation) by increasing the size limit. In alternative embodiments, efficiency can be increased (while slightly degrading security) by decreasing the size limit.

System Description

FIG. 1 is a block diagram that schematically illustrates a facility 20 that uses complex formats 26 for encrypting a plaintext 22 into a ciphertext 24 and decrypting the cipher text back to the plaintext, in accordance with an embodiment of the invention. Facility 20 comprises a local computer 28 in communication with a remote computer 30 via a wide area network (WAN) 32.

Local computer 28 comprises an encryption processor 34, a local memory 36 and a storage device 38. As described hereinbelow, memory 36 initially stores primitives 40, and processor 34 is configured to create complex formats 26 from the multiple primitives, to receive plaintext 22, and to encrypt the plaintext using a given complex format 26. In the configuration shown in FIG. 1, processor 34 receives plaintext 22 by retrieving the plaintext from storage device 38. Additionally, as explained hereinbelow, if processor 34 has already created one or more complex formats 26, the encryption processor can create an additional complex format 26 from a combination of one or more of the previously defined complex formats and/or one or more primitives 40.

While the example in FIG. 1 shows processor 34 retrieving plaintext 22 from storage device 38, the encryption processor receiving the plaintext from a different device is considered to be within the spirit and scope of the present invention. In some embodiments, processor 34 can receive plaintext 22 from a user via an input device such as a keyboard (not shown). In an alternative embodiment, processor 34 can receive plaintext 22 from an additional computer (not shown) via a network connection such as WAN 32.

Remote computer 30 comprises a decryption processor 42, and a remote memory 44. As explained hereinbelow, upon receiving ciphertext 24 from computer 28 and storing the ciphertext to memory 44, processor 42 is configured to decrypt the ciphertext back to plaintext using the same given complex format 26 that processor 34 used to encrypt the plaintext.

Memories 36 and 44 both store a message space 46, which is also referred to herein as message space M or simply M. Message space 46 comprises multiple entries (not shown), which are used for ranking and unranking during encryption and decryption, as explained in detail hereinbelow.

Processors 34 and 42 typically comprise a general-purpose computer, which are programmed in software to carry out the functions described herein. The software may be downloaded to systems computers 28 and 30 in electronic form, over a network, for example, or it may be provided on non-transitory tangible media, such as optical, magnetic or electronic memory media. Alternatively, some or all of the functions of processors 34 and may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Complex Format Preserving Encryption

Figure 2:
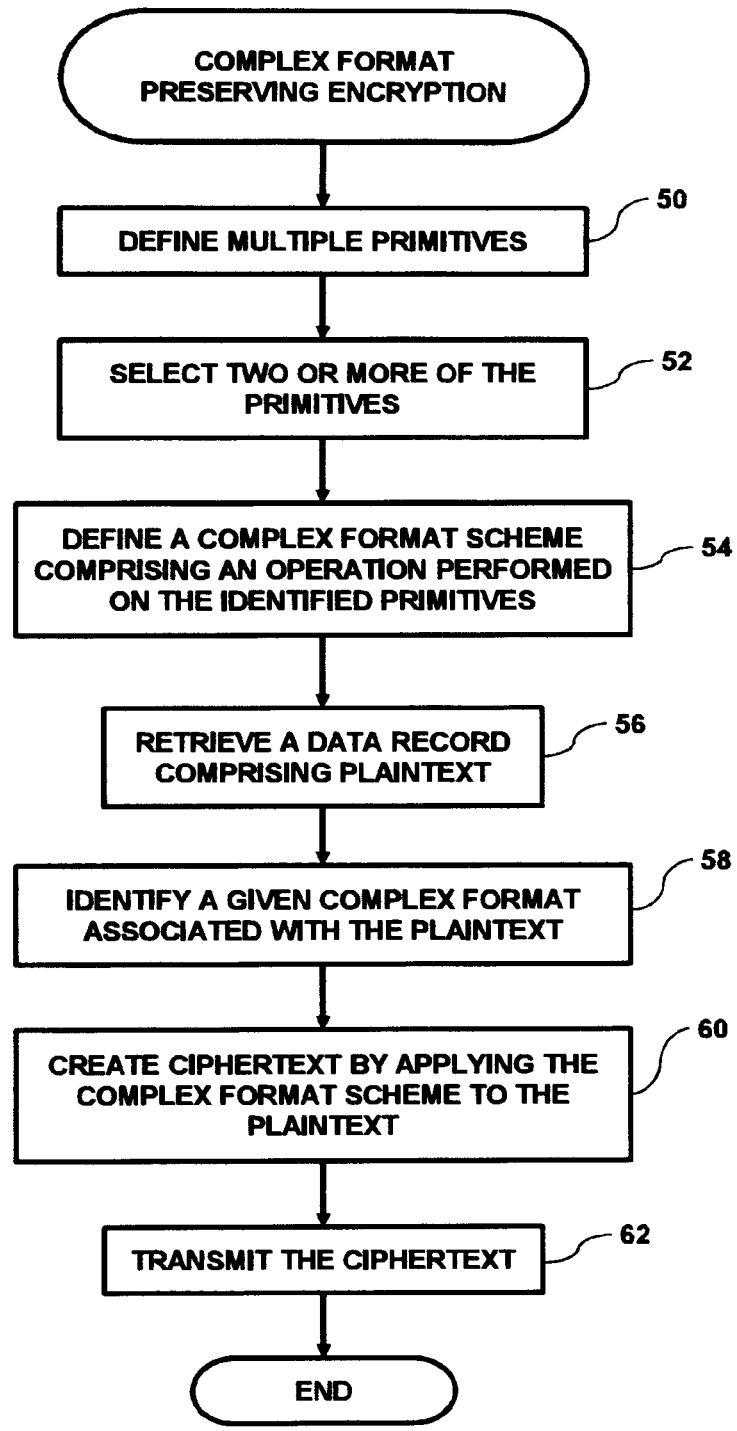
FIG. 2 is a flow diagram that schematically illustrates a method of using a given complex format preserving encryption scheme to encrypt plaintext, in accordance with an embodiment of the present invention.

FIG. 2 is a flow diagram that schematically illustrates a method for complex format encryption, in accordance with an embodiment of the present invention. In an initialization step 50, processor 34 defines multiple primitives 40, and stores the primitives to memory 36. Each primitive 40 typically comprises FPE ranking and unranking methods representing a "rigid" format that can be used to design efficient general-format ranking and unranking algorithms. Additionally, as described hereinbelow, primitives 40 can be used as "building blocks" to create one or more complex formats 26. Each primitive 40 (e.g., SSN) typically requires specially-tailored ranking and unranking methods. Primitive types include, but are not limited to:

Social Security Numbers (SSN). A valid SSN consists of a nine digit decimal string with specific restrictions.

Credit card numbers (CCN). A valid CCN consists of a 16 digit decimal string with a valid luhn sum-check digit as the 16th digit.

Dates. Dates can have various formats (e.g., MM/DD/YY and DD/MM/YYY). Additionally a date FPE can specify a range of valid dates (i.e., between a start and an end date).

Numerical domains. Numerical domains comprise integral numbers between a minimum and a maximum value.

Text strings having a fixed length l, with location-specific character-sets, so that every index is defined by a set of "legal" characters.

Strings of variable lengths (each length between a minimum and a maximum value) and comprising a set of "legal" characters.

In a select step 52, processor 34 selects two or more primitives 40, and in a definition step 54, the encryption processor performs an operation on the selected primitives in order to defining a given "non-rigid" complex format 26. In some embodiments, performing the operation on the selected primitives comprises concatenating the selected primitives. In additional embodiments, performing the operation on the selected primitives comprises generating a union of the selected primitives. In further embodiments, the operation may comprise a combination of concatenation and union. More generally, any combination of these operations is possible.

In supplemental embodiments, processor 34 can repeat select-step 52 and definition-step 54 in order to define multiple complex formats 26. Upon processor 34 defining the multiple complex formats, the encryption processor can create an additional complex format using one or more previously defined complex formats 26. In a first supplemental embodiment, processor 34 can create the additional complex format by performing the operation (i.e., concatenation and/or union) on a plurality of the multiple complex formats. In a second supplemental embodiment, processor 34 can create the additional complex format by performing the operation (i.e., concatenation and/or union) on one or more of the multiple complex formats 26 and one or more primitives 40.

General examples of a concatenation operation performed on one or more primitives 40 and/or one or more complex formats 26 include, but are not limited to:

Strings $s=s_1 \ldots s_n$, where $s_1, \ldots, s_n$ have primitive format-types $P_1, \ldots, P_n$, or have format-types $F_1, \ldots, F_n$ (either primitives 40 or complex formats 26) defined over disjoint alphabets. By adding delimiter-characters between the substrings $s_1, \ldots s_n$, the disjointedness requirement can be eliminated. This concatenation is referred to herein as a type-"a" concatenation.

Strings $s=s_1 ds_2 d \ldots ds_n$, where min<=n<=max for some min and max values, all substrings have the format defined by some field F', and d is a delimiter character not contained in the alphabet of F'. This concatenation is referred to herein as a type-"b" concatenation.

In a specific example of concatenation, the complex format "date,SSN,CCN" described hereinabove can be obtained by the comma-delimited concatenation of the primitives date, SSN and CCN. Similarly, the complex format "name str strNum city zip country" can be constructed as the space-delimited concatenation of the formats X, Z, Y, W, Y, defined as follows. Let U be a concatenation of the two primitives T and V, where T contains upper-case letters (i.e., length-1 strings) and V contains lower-case letter strings of length 1-62. Then, X is a space-delimited concatenation of 2-8 substrings with the format U, Z is a numerical domain defined by a minimal value 1 and a maximal value 1053, Y is a space-delimited concatenation of 1-4 substrings with the format U, and W consists of 7-digit strings.

Unions of primitives 40, where the complex format F can be expressed as $$F = UNION(F1, \ldots, Fn),$$

wherein F includes all strings s such that s has the format $F_i$ for some 1<=i<=n.

A specific example of a union operation comprises a street number number complex format 26. For example, a valid street number can be of the form "M/N" where, e.g., 1<=M<=3000 and 1<=N<=99, or of the form "M" where, e.g., M<=3500. The complex format can then be defined as UNION ($F_1$, $F_2$) where $F_1$ is of the form M/N (representing an apartment in an apartment building), and $F_2$ is the format M (representing a private house).

Returning to the flow diagram, in a receive step 56, processor 34 receives a data record comprising plaintext 22. As described supra, processor 34 can receive plaintext 22 by retrieving the plaintext from storage device 38, by receiving the plaintext from a user input device such as a keyboard (not shown), or receive the plaintext from a communications port (not shown).

In an identification step 58, processor 34 identifies a given complex format 26 associated with the received plaintext, and in an encryption step 60, the encryption processor applies the given complex format to plaintext 22, in order to generate ciphertext 24 from the plaintext. To generate ciphertext 24, processor 34 can perform the following steps:

Initialize message space 46 with multiple entries which are used for ranking and unranking while generating the ciphertext. Each of the entries in message space 46 has a corresponding index.

Map, using the identified complex format 26, plaintext 22 (also referred to herein as a message m) to a numeric value that comprises an index in message space 46. In some embodiments processor 34 can define a mapping from a message space M to $\{1, 2, \ldots |M|\}$, where the i'th message in M is mapped to the number i. Consequently, the message m is mapped to its index $i_m$ in M. This mapping comprises a "Ranking" of m.

Encrypt the number $i_m$ into a number j, by applying an encryption algorithm of an integer-FPE scheme that maps the set $\{1, 2, \ldots |M|\}$ onto itself. In other words, processor 34 encrypts a first number $i_m$ (also referred to herein as a first index) into a second number j (also referred to herein as a second index), wherein $i_m$ and j are in the same domain M.

The j'th message m' in M is the encryption of m. (The process of finding m' given its index in M is called "unranking"). In other words, the input for the unranking process comprises a number (j), and the output (i.e., the result of the encryption) comprises a message in M that is obtained by retrieving, from message space 46, a given entry having the second given index.

Returning to the flow diagram, in a transmission step 62, processor 34 transmits ciphertext 24 to remote computer 30, and the method ends. Upon receiving ciphertext 24, processor 42 can regenerate original plaintext 22 by storing the cipher text to memory 44, and using the given complex format that is stored in the remote memory and associated with the ciphertext to regenerate (i.e., decrypt), in memory 44, the received ciphertext back to the original plaintext 22. To regenerate plaintext 22, processor 42 can reverse the steps described in step 60 as follows:

Receive message m', and map, using the identified complex format 26, m' to j.

Apply a decryption algorithm of the integer-FPE scheme to decrypt j into i.

Retrieve the i'th message in M. The retrieved contents comprise plaintext 22.

Continuing the example described in step 60 hereinabove, processor 42 can perform these three steps by:

Mapping, using the identified complex format 26, ciphertext 24 to the second given index.

Applying a decryption algorithm of the integer format preserving encryption (FPE) scheme to decrypt the second given index to the first given index.

Retrieving, from message space 46, a second given entry having the first given index.

While encrypting plaintext 22 and decrypting ciphertext 24, facility 20 can use ranking and unranking formats for multiple messages (i.e., entries in message space 46) as follows: A "natural" (i.e., efficiently-computable) order can be defined for every format, and a given message can then be ranked to the number of messages before it in this order. An unranking procedure reverses the operations of the ranking procedure. More specifically, facility 20 can provide specific ranking and unranking procedures for primitives 40, and a general procedure for ranking and unranking complex formats 26.

For example, an SSN ranking algorithm can interpret a string as a 9-digit decimal number N, and subtract from N the number of values which are smaller than N and do not constitute legal SSNs. To rank variable-length strings, facility 20 can first order the character-set of the strings, thus inducing a lexicographic order on all same-length strings. A string s of length l can be mapped to its lexicographic order in the set of variable-length strings. That is, s is mapped to $N_1+N_2$, where $N_1$ comprises the number of shorter strings with the given format, and $N_2$ comprises the location of s in the lexicographic order on length-l strings with the given format.

In operation, the specific methods used to rank a string s in a given complex format 26 (referred to herein as F) depend on the composition operations used to construct F, as shown in the following examples.

In a first example, a string s in a type-"a" concatenation F is first parsed as $s=s_1 \ldots s_n$ (according to the sub-formats $F_1, \ldots, F_n$ used to construct F). Then, the rank is taken to be the scaled sum of the ranks of the substrings $s_1, \ldots, s_n$. More specifically, every string $s_i$ is ranked in relation to the set of strings in the format $F_i$. To guarantee the mapping is 1:1 (and therefore reversible), when summing the ranks, the i'th rank is scaled by $|F_1| \ldots |F_{(i-1)}|$, i.e., by the product of the sizes of the formats up to $F_i$. (This is a generalization of our counting method. A number 123 is also the scaled sum of the "contribution" of all digits, as it is equal to $3+2*10+1*10^2$. Here, every "format" is the set of digits, and therefore has size 10.) In this example, parsing s does not compromise security, since s is still ranked in relation to the entire format F.

In a second example, a string s in a type-"b" concatenation F is first parsed as $s=s_1 d \ldots d s_n$ where min$<=n<=$max and for every $1<=i<=n$, $s_i$ has the format F', where F' is the sub-format used to define F. Then, the rank is taken to be $N_1+N_2$, where $N_1$ comprises of the rank of s among strings consisting of exactly n substrings ($N_1$ is computed as described above for type-"a" concatenations), and $N_2$ is the total number of strings consisting of at least min and less than n concatenations.

In a third example, a string s in a union format F=UNION $(F_1, \ldots, F_n)$ is ranked to the number $N_1+N_2$, where $N_1$ is the rank of s in the first sub-format $F_i$ to which s belongs, and $N_2=|F_1|+ \ldots +|F_{(i-1)}|$ (i.e., $N_2$ is an offset, which is the size of the formats before Fi).

In some embodiments, general-format format-preserving encryption and decryption algorithms can be obtained from ranking and unranking methods using the Rank-then-Encipher method described supra (without cycle-walking). Thus, facility 20 can use any integer-FPE scheme, and in particular provably-secure schemes.

In operation, encrypting very large domains may be more complicated. This is due to the fact that the encryption procedure, when applied to a large message domain, may be very slow. Consequently, it may be preferable to set a maximal size of format types. In some embodiments, facility 20 can obtain a user-defined size-limited scheme with optimal security (under the size restriction). For example, let maxSize denote a user-defined bound on the maximal format-size, i.e., ranking and unranking is computed in relation to sets of size at most maxSize. As the size of complex formats can exceed maxSize, facility 20 can implement ranking and unranking methods that comply with the size restriction.

Additionally, given a string s in a format F (whose size exceeds maxSize), s can be partitioned into substrings, each substring is ranked, encrypted and then unranked separately in the corresponding sub-format, and the obtained ciphertexts are then concatenated to give the encryption of s. The partitioning can be performed according to the format structure, rather than by message-specific attributes. For example, in the address format discussed above, we can partition a given address to "name str", strNum city" "zip country" instead of partitioning the format according to the number of words in the name, which is an attribute of the specific address being encrypted. Then, ranking is done inclusively, since the sub-formats are taken to be as large as possible. Thus, the ciphertext hides as many message-specific properties as possible, and the scheme achieves optimal security under the limitation on format sizes.

In operation, upon processor 34 detecting that a given complex format 26 has a format domain size greater than maxSize, the encryption processor can split the given complex format into a plurality of sub-formats, each of the sub-formats having a sub-formatdomain size less than or equal to maxSize.

To encrypt plaintext 22 using a given complex format 26 whose format domain size is greater than maxSize, processor 34 can divide the plaintext into multiple sub-plaintexts, each of these sub-plaintexts having a respective sub-format, apply each of the sub-formats to its respective sub-plaintext, thereby generating a respective sub-ciphertext, concatenate the sub-ciphertexts, thereby creating ciphertext 24 in memory 36, and transmit the concatenated ciphertext to remote computer 30.

Upon processor 42 receiving the concatenated ciphertext, the decryption processor can divide, in memory 44, the received ciphertext back into the multiple sub-ciphertexts, apply each of the sub-formats to its respective sub-ciphertext, thereby regenerating a respective sub-plaintext, and concatenate the generated sub-plaintexts, thereby regenerating plaintext 22.

Large Format Preserving Encryption

FPEs for general formats are motivated by real-life applications in which various message formats need to be preserved under encryption. These formats are often very large which, as described in the previous section, causes integer-FPE-based schemes to be impractical. More generally, the efficiency of the Rank-then-Encipher (RtE) method relies heavily on the size of the format, since all the encryption phases (ranking, unranking and integer-encryption or decryption) are computed in relation to the format size. The sizes of real-life formats are unlimited, so if the system sets no upper-bound on permissible format sizes, any General-Format Preserving Encryption (GFPE) will soon become too inefficient to be used. Concretely, even seemingly simple formats such as the name or address formats described herein may be too large to be efficiently encrypted.

Despite being a major practical obstacle, known solutions ignore the issues arising when encrypting large formats. We remedy this by extending the framework described herein to support large formats. Next, we review our strategy for supporting large formats and then describe the encryption and decryption algorithms for a generalized scheme.

To guarantee efficient encryption of large formats, facility 20 needs to ensure that ranking, unranking, encryption and decryption are independent of the format size $\| \mathcal{F} \|$, which can only be achieved by restricting the format size. This can cause security degradation, so a main goal is to minimize this loss. However, embodiments of the present invention stress that any restriction of the format to sub-formats results in a message privacy (MP)-insecure scheme (and consequently also Format Preserving Random Permutation (FPRP)- and single-point indistinguishability (SPI)-insecurity). Therefore, we focus on the practical security of the scheme, drawing from the security analysis of existing simple general-format FPEs (SGFPEs) described above. Concretely, we try to hide message-specific attributes, since these can be used to recover the encrypted message from its ciphertext. Intuitively, this is achieved by dividing a format to as few "pieces" as possible, where the division is according to the sub-formats from which the format was constructed.

More specifically, given a size bound maxSize, we guarantee that the format size used for encryption does not exceed maxSize by splitting the format. Following the methodology in which formats are defined and ranked, splitting is preformed recursively by having a compound format pre-process the given plaintext (e.g., parse it) and then delegate the splitting to the sub-formats from which it was constructed. (As the one holding all information regarding its structure, the compound format is "responsible" for splitting the plaintext into ingredients, according to the sub-formats used to construct the format. This also allows the format to delegate the splitting operation to its sub-formats, when they themselves are larger than maxSize.) This raises several issues, which are addressed as follows.

The first question one should answer is how to split a given format $|\mathcal{F}|$. One strategy would be to split $|\mathcal{F}|$ to sub-formats $|\mathcal{F}|_1, \ldots, |\mathcal{F}|_2$, and applying the RtE method to each sub-format separately. Splitting can be based on message-properties (e.g., the number of words in the message and the number of letters in each word), but as described above, this may make the scheme completely insecure in practice. Alternatively, we could split $|\mathcal{F}|$ according to the lexicographic order on strings in $|\mathcal{F}|$ (i.e., split $|\mathcal{F}|$ to the union of sub-formats), but this would require some sort of ranking of $|\mathcal{F}|$ (and the running time will therefore depend on $\||\mathcal{F}|\|$), and would require $|\mathcal{F}|$ to compute the rank itself (namely, the ranking task could not be delegated to the underlying sub-formats).

Embodiments of the present invention propose a different solution that guarantees ranking is computed in relation to sets of size at most maxSize, and which allows the ranking to be computed recursively, by relying on what we call "the parsability property". The splitting strategy depends on the composition operations used to construct the compound format $|\mathcal{F}|$, but the main underlying idea is to generalize the RtE method to allow a message m to be ranked to a list of ranks. Thus, given a format $|\mathcal{F}|$ and a message $m \in |\mathcal{F}|$, $|\mathcal{F}|$ can be expressed as the concatenation $|\mathcal{F}| = |\mathcal{F}|_1 \cdot \ldots \cdot |\mathcal{F}|_k$ where $\||\mathcal{F}|_{-i}\| < \||\mathcal{F}|\|$, and parse m accordingly: $m = m_1 \ldots m_k$. Then, the encryption $c_i$ of each $m_i \in |\mathcal{F}|_i$ can be computed by RtE (notice that the RtE method is applied to a set of size $|F_i| < |F|$), and the encryption of m is set to $c := c_1 \ldots c_k$. This splitting strategy has several advantages. First, ranking can be delegated to the underlying formats $|\mathcal{F}|_1, \ldots, |\mathcal{F}|_k$. Second, if the sub-formats are chosen "correctly", then encryption hides many message-specific properties, since every $m_i$ is encrypted to any ciphertext in $|\mathcal{F}|_i$. For example, the address format $|\mathcal{F}|_{address}$ can be split so that $|\mathcal{F}|_1 = |\mathcal{F}|_{name}$. Then the name in a given address is mapped to any valid name, and the message-specific properties discussed above remain entirely hidden.

Splitting formats and encrypting ranks in relation to various sub-formats raises the following issue. The integer-FPE algorithms expect a size M (determining the integer-domain $M_{int} := \{0, 1, \ldots, M-1\}$, and an index $i \in M_{int}$ to encrypt or decrypt. A message $m \in |\mathcal{F}|$ is represented by a list $r_1 \to r_2 \to \ldots \to r_n$ of ranks, where every $r_i$ was computed by the sub-format $|\mathcal{F}|_i$ in relation to $\||\mathcal{F}|_i\|$. The sizes $\||\mathcal{F}|_1\|, \ldots, \||\mathcal{F}|_1\|$ may be different, and are possibly unknown to $|\mathcal{F}|$ (since ranking was delegated to, and performed by, the sub-formats $|\mathcal{F}|_1, \ldots, |\mathcal{F}|_k$). In particular, splitting can be repeated if some sub-format $|\mathcal{F}|_i$ is in itself too large (in this case, the ranking procedure of $|\mathcal{F}|_i$ would return a list of ranks). Thus, we can extend the ranking procedure to return not only a list of ranks, but also a list of sizes, where the i'th size is the size of the set in relation to which the i'th rank was computed. Thus, $|\mathcal{F}|$ can maintain a list of sizes corresponding to the list of ranks, and the integer-FPE encryption (and decryption) algorithms are applied to the size $M_i$ and the rank $r_i$. In some embodiments, the unranking method is given an "example" string with the same format as the string it should return. (For encryption, this is the message to encrypt. For decryption, this is the ciphertext to decrypt.)

To support large formats in the GFPE described herein, embodiments of the present invention provide splitting operations for formats, and generalize the RtE method such that the rank (resp., unrank) method returns (resp., receives) a list of ranks, and a list of sizes in relations to which the ranks were computed. Due to space limitations, the splitting algorithms of non-compound formats can be omitted. (Note that such formats are usually smaller so splitting is less likely.)

In embodiments of the present invention, splitting compound formats comprises both splitting the format to sub-formats, and delegating the splitting operation to underlying formats. In the following description, let maxSize denote the upper bound on permissible format sizes.

Union. Let $F = F_1 \cup \ldots \cup F_k$ be a compound format obtained through union.

Splitting. F splits itself to sub-formats $F = F'_1 \cup \ldots \cup F'_{k'}$, for some $k' \leq k$ as follows: Let $i_1 < i_2 < \ldots < i_{k'} \in \{1, 2, \ldots, k\}$ be indices such that for every $1 \leq j < k'$, either $$\sum_{l=i_j}^{i_{j+1}-1} |F_l| \leq \max \text{Size and } \sum_{l=i_j}^{i_{j+1}} |F_l| > \max \text{Size, or } i_{j+1} = i_j + 1,$$

then $F'j := F_{i_j} \cup \ldots \cup F_{i_{j+1}-1}$. That is, the sub-formats $F_1, \ldots, F_k$ are grouped into the minimal possible number of unions, such that the format defined by every union does not exceed maxSize, or (if that is not possible) the union consists of a single format $F_i$. (That is, if $|F_i| > \text{maxSize}$ for some $1 \leq i \leq k$, then $F_i$ is taken to be in a union of its own.)

Ranking. The rank of a message $m \in F$ is computed by finding the index $1 \leq i \leq k'$ such that $m \in F'_i$ and delegating the ranking of m to $F'_i$. In particular, if $|F'_i| \leq \text{maxSize}$ then ranking is performed by $F'_i$ directly (without any additional splitting), and the ranking returns a ranks-list containing a single rank r and a sizes-list containing a single size $$|F'_i| = \sum_{l=i_j}^{i_{j+1}-1} |F_l|.$$

Otherwise, $F'_i=F_j$ for some $1\le j\le k$ such that $|F_j|>\text{maxSize}$, and $F_j$ first splits itself, before computing the rank. In this case, $F'_i$ returns ranks-lists and sizes-lists with several entries.

Unranking. The unranking method receives a ranks-list R, a sizes-list S, and a message $f\in F$ (usually the ciphertext), expected to have the same format of the message m whose ranking returned the lists R,S. In other words, m belongs to some sub-format $F'_i$, and the unranking method expects a string f such that $s\in F'_i$. The unranking method uses f to determine to which sub-for $F'_i$, $1\le i\le k'$ the message m belongs, and delegates the unranking operation to $F'_i$. Concretely, if $|F'_i|\le\text{maxSize}$ then unranking is performed directly (in this case the ranks-list contains a single entry), and otherwise $F'_i$ first splits itself and then unranks the ranks-list.

Type-"a" concatenation. We consider only a compound format $F=F_1\cdot d_1\cdot F_2\cdot d_2\ldots d_{k-1}\cdot F_k$ obtained through concatenation. (The corresponding algorithms for a format $F=F_1\cdot\ldots\cdot F_k$ are slight adaptations of the algorithms presented below.)

Splitting. F splits itself to sub-formats $F=F'_1\cdot\ldots\cdot F'_{k'}$, for some $k'\le k$ as follows: Let $i_1<i_2<\ldots<i_{k'}\in\{1,2,\ldots,k\}$ be indices such that for every $1\le j<k'$, either $$\prod_{l=i_j}^{i_{j+1}-1}|F_l|\le \max\text{Size} \text{ and } \prod_{l=i_j}^{i_{j+1}}|F_l|>\max\text{Size, or } i_{j+1}=i_j+1,$$

then $F'_j:=F_{i_j}\cdot d_{i_j}\cdot\ldots\cdot d_{i_{j+1}-2}\cdot F_{i_{j+1}-1}\cdot d_{i_{j+1}-1}$. (Similar to splitting a union, if $|F_j|>\text{maxSize}$ for some $1\le j\le k$ then $F_j\cdot d_j$ is taken to be in a sub-concatenation of its own.) Intuitively, the sub-formats $F_1,\ldots,F_k$ are grouped into the smallest number of sub-concatenations, such that the format defined by every sub-concatenation does not exceed maxSize, or (if that is not possible) the sub-concatenation consists of a single format $F_i$.

Ranking. To rank a given message $m\in F$, it is parsed to $m=m_1\ldots m_k$, where $m_i\in F'_i$ for every $1\le i\le k'$ (this can be done since m can be parsed according to $F_1,\ldots,F_k$). Then, the rank $r_i$ of every $m_i$ is computed in relation to $F'_i$. Concretely, if $|F'_i|\le\text{maxSize}$ then $r_i$ is computed as the rank of the sub-concatenation defined by $F'_i$. Otherwise, $F'_i=F_j$ for some $1\le i\le k$, and ranking is delegated to $F_j$ (the ranking method of $F_j$ will first split $F_j$).

Unranking. The unranking method receives a ranks-list R, a sizes-list S, and a message $f\in F$, expected to have the same format of the message m whose ranking returned the lists R,S. The unranking method parses f to $f=f_1\ldots f_k$ where $f_i\in F'_i$ for every $1\le i\le k'$, and then delegates the unranking to $F'_1,\ldots,F'_k$ (the unranking of each $F'_i$ is given $f_i$ and the corresponding entries in R,S).

Type-"b" concatenation. Let F be a compound format, defined as the range over some format F' with parameters F',d and min<max. (That is, all strings s in F have the form $s=s_1 d s_2 d\ldots s d_n$, where min$\le$n$\le$max, all substrings have the format F', and d is the delimiter.)

Splitting. The format splits itself to sub-formats $F=F_1\cup\ldots\cup F_k$ as follows: Let $i_1<i_2<\ldots<i_k\in\{\text{min},\text{min}+1\ldots,\max\}$ be indices such that for every $1\le j<k'$, either $$\sum_{l=i_j}^{i_{j+1}-1}|F'|^l\le\max\text{Size and }\sum_{l=i_j}^{i_{j+1}}|F'|^l>\max\text{Size, or } i_{j+1}=i_j+1,$$

then $F'_j$ is defined as the range over F' with parameters $d,i_j, i_{j+1}-1$. Intuitively, the sub-formats $F_1,\ldots,F_k$ are grouped into the smallest number of sub-ranges, such that the format defined by every sub-range does not exceed maxSize, or (if that is not possible) the sub-range consists of a single legal number of appearances of the format F'.

Ranking. The rank of a message $m\in F$ is computed by finding the index $1\le i\le k'$ so that $m\in F'_i$, and delegating the ranking of m to $F'_i$ (i.e., finding the sub-range to which m belongs, and ranking m in that sub-range). In particular, if $|F'_i|\le\text{maxSize}$ then ranking is performed by $F'_i$ directly (without any additional splitting), otherwise the sub-range corresponds to a compound format obtained through type-"a" concatenation (since there is a single legal number of appearances), and the rank is computed as defined above for type-"a" concatenation.

Unranking. The unranking method receives a ranks-list R, a sizes-list S, and a message $f\in F$, expected to have the same format of the message m whose ranking returned the lists R,S. The unranking method uses f to determine the sub-format $F'_i$, $1\le i\le k'$ to which the message m belongs, and delegates the unranking operation to $F'_i$.

In some embodiments, the unranking methods for all composition operations encrypt every rank in the ranks-list separately. Thus, given a list $R'=r_1'\to\ldots,\to r_n'$ of encrypted ranks and a format string f, the method returns a list $c_1\to\ldots\to c_n$ of strings such that every $c_i$ is the unranked value of $r_i'$, and the string $c=c_1\ldots c_n$ has the same format as the string i.

The encryption and decryption algorithms are also extended to allow encryption of ranks-lists. Concretely, encryption is executed as follows (Decryption is executed in the same manner, but the integer-FPE encryption is replaced by integer-FPE decryption.) Given a message m for encryption and a format $|\mathcal{F}|$ (such that $m\in|\mathcal{F}|$), we call $|\mathcal{F}|$.rank (m) whose outputs are a ranks-list $R=r_1\to\ldots\to r_n$ and a sizes-list $S=s_1\to\ldots\to s_n$. Then, the integer-FPE encryption algorithm is invoked on every $r_i$ and $s_i$ (that is, $r_i$ is encrypted in the domain $\{1,\ldots,si\}$), and let $R'=r_1'\to\ldots,\to r_n'$ denote the list of encrypted ranks. Finally, the unranking procedure of $|\mathcal{F}|$ is called on input the ranks-list R' and the format string m, and returns a list $c_1\to\ldots,\to c_n$ of unranked strings. The encryption algorithm outputs $c=c_1\ldots c_n$ as the encryption of m.

Security of our large-formats GFPE. In embodiments of the present invention, large formats are split into smaller sub-formats and messages are encrypted according to the sub-format to which they belong. Therefore, attacks can also be applied to our scheme, which is unavoidable when a bound on format sizes is enforced. (As described above, this bound is required due to practical considerations). However, splitting can be performed so that the highest possible level of security is maintained. Concretely, a format is split according to its ingredients, rather than by message-specific properties, so these message-specific properties that are not part of the format definition remain mostly hidden. For example, for the address format $|\mathcal{F}|_{address}$ of described supra, splitting can be (say) to the sub-formats $$|\mathcal{F}|'_1 = |\mathcal{F}|_{name} \cdot |\mathcal{F}|_{num} \cdot |\mathcal{F}|_{space} \cdot |\mathcal{F}|'_2 =$$
$$|\mathcal{F}|_{doubleName} \cdot |\mathcal{F}|_{zip} \cdot |\mathcal{F}|_{space} \cdot |\mathcal{F}|'_3 =$$
$$|\mathcal{F}|_{state}.$$

In these sub-formats, the first sub-format $|\mathcal{F}|'_1$ contains a person's name and a street number, the second sub-format $|\mathcal{F}|'_2$ contains a street name, the town name and the zip code (as well as the space separating the zip code and the country), and the third sub-format $|\mathcal{F}|'_3$ contains a state. In embodiments of the present invention, encryption can be performed separately for these "ingredients" (i.e., sub-formats), but every part of the address can be encrypted to any legal element in the corresponding sub-format. For example, the name in the encrypted address comprises any legal name. This is a significant improvement over the simple general-format FPE (SGFPE), which maintains all characteristics of the original name. However, the splitting strategy described herein has one unavoidable disadvantage, which is that every substring is encrypted independently of the other substrings. Thus, if $addr_1$ and $addr_2$ are two addresses with the same name and street number, their respective ciphertexts $c_1$ and $c_2$ will also have the same (encrypted) name and street number (so an attacker learns that the two encrypted messages have the same name and street number).

However, this security loss is necessary since splitting is unavoidable given an upper-bound on format sizes, which in turn is essential for efficiency. Moreover, the security loss is minimized in our solution since we split the format to the minimal number of "pieces" (i.e., sub-formats). Thus, if two addresses only share the name (and have different street numbers), then their ciphertexts will have different names because the name and street number are encrypted together (while in SGFPE, both ciphertexts will have the same name).

The concrete level of security achieved by the large-format GFPE scheme described herein depends on the value chosen for maxSize. In some embodiments, the splitting strategy maximizes the size of the sub-formats under the size limitation induced by maxSize. For example, if maxSize is $2^{128}$, then splitting reduces the message-space to size $2^{128}$. Thus, if an attacker learns no message-specific properties (other than the message being in this smaller message-space), the probability of recovering the message is at most $2^{-128}$, which can be ignored for all practical purposes. It must be stressed, however, that maxSize should be taken to be as large as possible (where permissible sizes depend on the efficiency constraints of the system), since decreasing the maxSize parameter decreases the sizes of the sub-formats, thus increasing the success probability of an attacker trying to guess the message given its encryption.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
managing, in a memory, a list of format definitions, including multiple primitive formats, each format definition being associated with a respective ranking function and a respective unranking function;
receiving, by a computer associated with the memory, indications defining a complex format, the indications including two or more of the format definitions in the managed list and one or more combining operations to be applied to the indicated two or more different format definitions to define the complex format;
generating, by the computer, a ranking function and an unranking function for the complex format defined by the received indications, responsive to the received indications and the respective ranking and unranking functions of the indicated format definitions;
receiving a data record comprising a plaintext;
applying, by an encryption processor, the ranking function of the complex format to the plaintext;
encrypting a result of applying the ranking function of the complex format to the plaintext; and
applying the unranking function of the complex format to the encryption of the result, thereby generating a ciphertext,
wherein the method further comprises specifying a maximum domain size, and upon detecting that the complex format has a format domain size greater than the maximum domain size, splitting the complex format into a plurality of sub-formats, each of the sub-formats having a sub-format domain size less than or equal to the maximum domain size, and
dividing, by the encryption processor, the plaintext into multiple sub-plaintexts, each of the sub-plaintexts having a respective sub-format, and wherein applying the ranking function of the complex format to the plaintext comprises applying a ranking function of each of the sub-formats to its respective sub-plaintext, thereby generating a respective sub-ciphertext, and wherein the ciphertext comprises a concatenation of the sub-ciphertexts.

2. The method according to claim 1, wherein the one or more combining operations included in the received indications are selected from a list consisting of concatenating indicated different format definitions and generating a union of the indicated different format definitions.

3. The method according to claim 1, and comprising storing in the memory a format definition of the complex format, and the ranking and unranking functions of the complex format.

4. The method according to claim 3, and comprising receiving indications defining a complex format formed of one or more of the multiple primitives and one or more of the complex formats having a record stored in the memory and defining an additional complex format based on a combination of the one or more of the multiple primitives and the one or more complex formats having a record stored in the memory.

5. The method according to claim 1, wherein encrypting the result comprises applying an encryption algorithm of an integer format preserving encryption (FPE) scheme.

6. The method according to claim 5, and comprising transmitting the ciphertext to a remote computer, and upon receiving the ciphertext, applying, by the remote computer, the complex format to the received ciphertext, thereby regenerating the plaintext.

7. The method according to claim 6 wherein regenerating the plaintext comprises mapping, using the ranking function of the complex format, the ciphertext to a second given index, applying a decryption algorithm of the integer format preserving encryption (FPE) scheme to decrypt the second given index to a first given index, and applying the unranking function of the complex format to the first given index.

8. The method according to claim 7, and comprising dividing, by the decryption processor, the ciphertext back into the multiple sub-ciphertexts, and wherein applying the complex format to the ciphertext comprises applying each of the sub-formats to its respective sub-ciphertext, thereby regenerating a respective sub-plaintext, and wherein the regenerated plaintext comprises a concatenation of the sub-plaintexts.

9. A computing system, comprising:
a local memory managing a list of format definitions, including multiple primitive formats, each format definition being associated with a respective ranking function and a respective unranking function; and
an encryption processor configured:
to receive indications defining a complex format, the indications including two or more of the format definitions in the managed list, and one or more combining operations to be applied to the indicated two or more different format definitions to define the complex format;
to generate a ranking function and an unranking function for the complex format defined by the received indications, responsive to the received indications and the respective ranking and unranking functions of the indicated format definitions;
to receive a data record comprising a plaintext;
to apply the ranking function of the complex format to the plaintext,
to encrypt a result of applying the ranking function of the complex format to the plaintext, and
to apply the unranking function of the complex format to the encryption of the result, thereby generating a ciphertext,
wherein the encryption processor is configured to specify a maximum domain size, and upon detecting that the complex format has a format domain size greater than the maximum domain size, to split the complex format into a plurality of sub-formats, each of the sub-formats having a sub-format domain size less than or equal to the maximum domain size, and
wherein the encryption processor is configured to divide the plaintext into multiple sub-plaintexts, each of the sub-plaintexts having a respective sub-format, and in applying the ranking function of the complex format to the plaintext, the encryption processor is configured to apply a ranking function of each of the sub-formats to its respective sub-plaintext, thereby generating a respective sub-ciphertext, and wherein the ciphertext comprises a concatenation of the sub-ciphertexts.

10. The computing system according to claim 9, wherein the one or more combining operations included in the received indications are selected from a list consisting of concatenating indicated different format definitions and generating a union of the indicated different format definitions.

11. The computing system according to claim 9, and wherein the encryption processor is configured to store in the memory a format definition of the complex format, and the ranking and unranking functions of the complex format.

12. The computing system according to claim 11, wherein the encryption processor is configured to receive indications defining a complex format formed of one or more of the multiple primitives and one or more of the complex formats having a record stored in the memory and defining an additional complex format based on a combination of the one or more of the multiple primitives and the one or more complex formats having a record stored in the memory.

13. The computing system according to claim 9, wherein the encryption processor is configured to encrypt the result by applying an encryption algorithm of an integer format preserving encryption (FPE) scheme.

14. The computing system according to claim 13, and comprising a remote computer in communication with the computing system, the remote computer comprising a decryption processor and a remote memory, and wherein the encryption processor is configured to transmit the ciphertext to the remote computer, and wherein the decryption processor is configured to receive the transmitted ciphertext, to apply the complex format to the received ciphertext, thereby regenerating, in the remote memory, the plaintext.

15. The computing system according to claim 14 wherein the decryption processor is configured to regenerate the plaintext by mapping, using the ranking function of the complex format, the ciphertext to a second given index, to apply a decryption algorithm of the integer format preserving encryption (FPE) scheme to decrypt the second given index to a first given index, and to apply the unranking function of the complex format to the first given index.

16. The computing system according to claim 15, wherein the encryption processor is configured to divide the ciphertext into the multiple sub-ciphertexts, and to transmit the multiple sub-ciphertexts to the remote computer,
and wherein the decryption processor is configured to receive the transmitted ciphertext by receiving the multiple sub-ciphertexts, and to apply the complex format to the ciphertext by applying each of the sub-formats to its respective received sub-ciphertext, thereby regenerating a respective sub-plaintext, and wherein the regenerated plaintext comprises a concatenation of the sub-plaintexts.

17. A computer program product, the computer program product comprising:
a non-transitory computer readable storage medium having computer readable program code embodied therewith, the computer readable program code comprising:
computer readable program code configured to manage, in a memory, a list of format definitions, including multiple primitive formats, each format definition being associated with a respective ranking function and a respective unranking function;
computer readable program code configured to receive, associated with the memory, indications defining a complex format, the indications including two or more of the format definitions in the managed list, and one or more combining operations to be applied to the indicated two or more different format definitions to a define the complex format;

computer readable program code configured to generate a ranking function and an unranking function for the complex format defined by the received indications, responsive to the received indications and the respective ranking and unranking functions of the indicated format definitions;

computer readable program code configured to receive a data record comprising a plaintext;

computer readable program code configured to apply the ranking function of the complex format to the plaintext, and to encrypt a result of applying the ranking function of the complex format to the plaintext; and computer readable program code configured to apply the unrankinq function of the complex format to the encryption of the result, thereby generating a ciphertext, wherein the computer readable code is configured to specify a maximum domain size, and upon detecting that the complex format has a format domain size greater than the maximum domain size, to split the complex format into a plurality of sub-formats, each of the sub-formats having a sub-format domain size less than or equal to the maximum domain size, and wherein the computer readable code is configured to divide the plaintext into multiple sub-plaintexts, each of the sub-plaintexts having a respective sub-format, and in applying the ranking function of the complex format to the plaintext, the encryption processor is configured to apply a ranking function of each of the sub-formats to its respective sub-plaintext, thereby generating a respective sub-ciphertext, and wherein the ciphertext comprises a concatenation of the sub-ciphertexts.

* * * * *